US007630323B2

(12) United States Patent
Bridgelall (10) Patent No.: US 7,630,323 B2
(45) Date of Patent: Dec. 8, 2009

(54) SELF-CONFIGURING WIRELESS PERSONAL AREA NETWORK

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 834 days.

(21) Appl. No.: 10/799,063

(22) Filed: Mar. 11, 2004

(65) Prior Publication Data

US 2005/0201300 A1 Sep. 15, 2005

(51) Int. Cl.
*H04L 12/28* (2006.01)
(52) U.S. Cl. .................. 370/254; 370/252; 455/456.1
(58) Field of Classification Search .......... 370/254, 370/255, 310, 312, 313, 252, 328; 455/456.1
See application file for complete search history.

(56) References Cited

U.S. PATENT DOCUMENTS

| | | | |
|---|---|---|---|
| 6,330,452 B1 | 12/2001 | Fattouche et al. | |
| 6,396,438 B1* | 5/2002 | Seal | 342/127 |
| 6,414,626 B1 | 7/2002 | Greef et al. | |
| 6,424,264 B1* | 7/2002 | Giraldin et al. | 340/573.1 |
| 6,738,628 B1* | 5/2004 | McCall et al. | 455/456.1 |
| 6,745,038 B2 | 6/2004 | Callaway et al. | |
| 6,747,560 B2* | 6/2004 | Stevens, III | 340/572.4 |
| 6,771,933 B1 | 8/2004 | Eng et al. | |
| 6,850,163 B1* | 2/2005 | Adamczyk et al. | 340/573.4 |
| 6,892,052 B2* | 5/2005 | Kotola et al. | 455/41.2 |
| 6,900,762 B2* | 5/2005 | Andrews et al. | 342/463 |
| 6,909,903 B2* | 6/2005 | Wang | 455/456.1 |
| 6,963,289 B2* | 11/2005 | Aljadeff et al. | 340/825.49 |
| 6,978,023 B2* | 12/2005 | Dacosta | 380/258 |
| 6,996,402 B2* | 2/2006 | Logan et al. | 455/456.1 |
| 7,024,207 B2 | 4/2006 | Gorday et al. | |
| 7,031,725 B2 | 4/2006 | Rorabaugh | |
| 7,142,839 B2* | 11/2006 | Pelaez et al. | 455/404.1 |
| 7,203,502 B2* | 4/2007 | Wilson et al. | 455/456.2 |
| 7,251,489 B2* | 7/2007 | Beasley et al. | 455/436 |
| 7,349,360 B2* | 3/2008 | Gutierrez et al. | 370/315 |
| 2002/0075940 A1 | 6/2002 | Haartsen | |
| 2002/0098852 A1* | 7/2002 | Goren et al. | 455/456 |
| 2002/0116460 A1 | 8/2002 | Treister et al. | |
| 2002/0137472 A1* | 9/2002 | Quinn et al. | 455/90 |
| 2003/0078002 A1 | 4/2003 | Sanjeev et al. | |
| 2003/0220835 A1* | 11/2003 | Barnes, Jr. | 705/14 |
| 2004/0029582 A1 | 2/2004 | Swab et al. | |
| 2004/0033808 A1 | 2/2004 | Rorabaugh | |
| 2004/0061646 A1* | 4/2004 | Andrews et al. | 342/463 |
| 2004/0176107 A1* | 9/2004 | Chadha | 455/456.5 |

(Continued)

*Primary Examiner*—Ricky Ngo
*Assistant Examiner*—Ben H Liu (57) ABSTRACT

Methods and apparatus are provided for forming a wireless personal area network (WPAN) from an array of intercommunicating personal area network (PAN) devices. The system comprises a location determinator configured to determine a location for each of the PAN devices, a comparator coupled to the determinator for comparing the location of each of the PAN devices with WPAN association criteria to choose a subset meeting the WPAN criteria at least in part, and a communication link coupled to the comparator to transmit identification data of the subset to some or all of the subset of PAN devices. When received, the information causes the subset to form the WPAN, which then intercommunicate substantially ignoring the non-WPAN devices. In a preferred embodiment, the comparator selects the WPAN from those of the plurality of PAN devices that are within a predetermined distance of each other and/or move as a group.

23 Claims, 5 Drawing Sheets

U.S. PATENT DOCUMENTS

| | | |
|---|---|---|
| 2004/0204046 A1 | 10/2004 | Bonta et al. |
| 2004/0212500 A1 | 10/2004 | Stilp |
| 2004/0235493 A1* | 11/2004 | Ekerborn ................. 455/456.1 |
| 2004/0246934 A1* | 12/2004 | Kim .......................... 370/338 |
| 2004/0259544 A1 | 12/2004 | Amos |
| 2005/0026569 A1 | 2/2005 | Lim et al. |
| 2005/0059410 A1* | 3/2005 | Trossen et al. ........... 455/456.1 |
| 2005/0107953 A1 | 5/2005 | Sugla |
| 2005/0124380 A1 | 6/2005 | Rokusek et al. |
| 2005/0135292 A1* | 6/2005 | Graumann .................. 370/328 |
| 2005/0143011 A1 | 6/2005 | Jacobsen |
| 2005/0156711 A1 | 7/2005 | Aljadeff et al. |
| 2005/0180343 A1* | 8/2005 | Van Valkenburg ........... 370/310 |
| 2006/0160573 A1 | 7/2006 | Montvay |

* cited by examiner

SELF-CONFIGURING WIRELESS PERSONAL AREA NETWORK

TECHNICAL FIELD

The present invention generally relates to wireless communication among distributed elements, and more particularly to automatic association of such distributed elements into a wireless personal area network (WPAN).

BACKGROUND

Many modern electronic devices are portable and capable of communicating with each other and various base stations using wireless signaling. Non-limiting examples are 2-way radios, telephones, headsets, bar code scanners, Global Positioning System (GPS) units, Personal Digital Assistants (PDAs), portable computers (PCs), printers, digital cameras, RF identification (RFID) tag readers/writers, chart plotters, and so forth. Sometimes, a number of these various elements may be carried by or associated with a single user or function and it is desired to mutually associate them electronically to form a wireless personal area network (WPAN). Once associated, the cooperating elements can exchange or share data by communicating directly with each other rather than indirectly via a central hub, and in general, ignore other units that may be within communication range but which are not part of the WPAN. It is known in the prior art to form such WPANs, but the association of the various elements into the WPAN had to be carried out manually. This is done, for example, by entering into each unit the identity of the other elements of the WPAN. Another way is to use a local sub-master unit as a temporary hub. The identities (IDs) of the units intended to make up the WPAN are manually entered or scanned into the sub-master and then the association information downloaded from the sub-master to each of the WPAN elements. While this approach works it suffers from a number of disadvantages among which are: it is time consuming to manually reconfigure and associate the units for a particular WPAN; the WPAN make-up is not easily changed, that is it is static rather than dynamic; it is more complex and inflexible than is desired; and it may require that the individual elements of the WPAN consume more power.

Accordingly, it is desirable to provide an improved arrangement for forming and using WPANs, especially to provide an arrangement and method capable of forming and reforming WPAN associations automatically. In addition, it is desirable that the arrangement and method be robust and inexpensive relative to the prior art and, insofar as possible, take advantage of existing technology and devices. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for forming a wireless personal area network (WPAN) from an array of intercommunicating personal area network (PAN) devices. The system comprises a location determinator configured to determine a location for each of the PAN devices, a comparator coupled to the determinator for comparing the location of each of the PAN devices with WPAN association criteria to choose a subset meeting the WPAN criteria at least in part, and a communication link coupled to the comparator to transmit the identification of the subset to some or all of the subset of PAN devices. When received, the information causes the subset to form the WPAN, which then intercommunicate substantially ignoring the non-WPAN devices. In a preferred embodiment, the comparator selects the WPAN from those of the plurality of PAN devices that are within a predetermined distance of each other and/or move as a group.

A method is provided for forming a Wireless Personal Area Network (WPAN) from a plurality of Personal Area Network (PAN) devices. The method comprises determining a location for each of the plurality of PAN devices, comparing the location determined for each of the PAN devices with WPAN association criteria, choosing a subset of the PAN devices whose locations at least partially satisfy the WPAN criteria, and transmitting identification of the devices in the subset to at least the subset of PAN devices. The subset of devices then self-organize into a WPAN. In a preferred embodiment, the choosing step comprises choosing those PAN devices that are within a predetermined distance of each other and/or move as a group.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
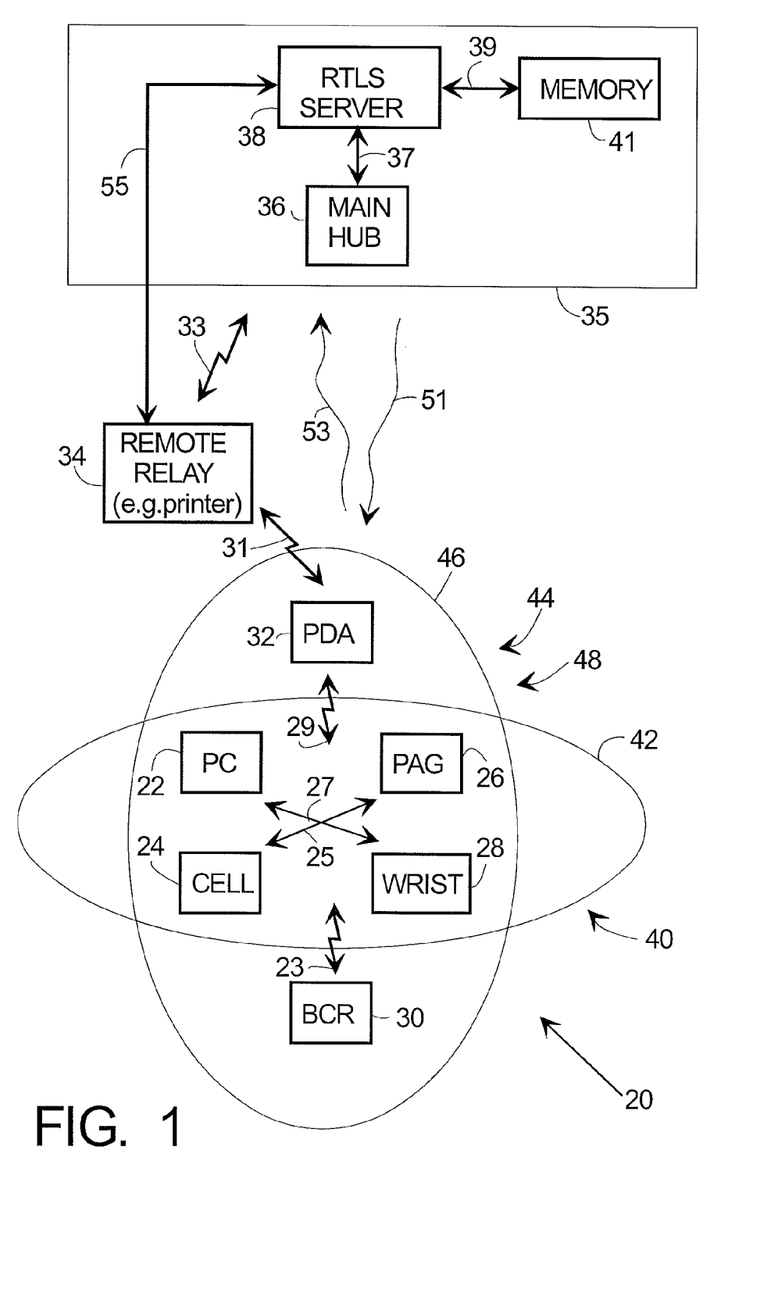
FIG. 1 is a simplified schematic diagram of a number of wireless elements forming a WPAN and illustrating coupling thereof to a base station.

FIG. 1 is a simplified schematic diagram of system 20 comprising a number of wireless elements 22, 24, 26, 28 forming WPAN 40 within spatial boundary 42 and illustrating coupling of WPAN 40 to central server 35 via main hub 36 and other elements 32, 34. For simplicity, the various antennas associated with elements 22, 24, 26, 28, 30, 32, 34, 36 needed to provide communication over wireless links 23, 25, 27, 29, 31, 33 are omitted from FIG. 1. However, persons of skill in the art will understand that antennas are included with the various wireless communication elements. For convenience of explanation, it is assumed that elements 22, 24, 26, 28 and 30, 32, 34 are in close proximity and able to mutually communicate at lower power and, perhaps, relatively higher speed over wireless links 23, 25, 27, 29, 31 using, for example, the well-known Bluetooth® protocol. However, this is not intended to be limiting and any convenient shorter range (SR), lower power (LP) communication protocol (abbreviated collectively as "SR-LP") may be used. Elements 34 and 36 mutually communicate via wireless link 33 at longer range and at higher power but, perhaps, relatively lower speed using, for example, the 802.11 signaling protocol. However, this is not intended to be limiting and any signaling protocol capable of transferring the necessary information may be used. As used herein, the term longer range (LR), higher power (HP), abbreviated collectively as "LR-HP", is intended to generally refer to such a communication system irrespective of the particular construction or signaling protocol used. Alternatively, wireline communication link 55 may be provided between server 38 and relay 34 instead of or in addition to wireless link 33 between elements 34, 36. Thus, in the preferred embodiment, at least two communication links are desirably used: (1) a SR preferably LP link among the various distributed elements 22, 24, 26, 28 and 30, 32, 34 and, (2) a LR preferably HP link (e.g., link 33) or a wireline link (e.g., link 55) between at least one of the distributed elements (e.g., element 34) and a base station (e.g., base station 35 of FIG. 1) that includes or is coupled to a central server. Bluetooth is a non-limiting example of a suitable SR-LP communication arrangement and 802.11 is a non-limiting example of a LR-HP communication arrangement, but neither is essential and other signaling protocols and arrangements may also be used. Non-limiting examples of alternative signaling protocols and arrangements are Zigbee™ and Ultra-Wideband (UWB) for which industry working groups have been formed. As will be more fully explained later other alternatives exist for communication link 33. For example, where separate signal relay 34 does not exist, this function can be assumed by one of the WPAN devices capable of acting as a master unit. Bluetooth also provides a LR-LP signaling protocol as well as the more typical SR-LP signaling protocol.

Elements 22, 24, 26, 28 30, 32, 34 illustrate different types of wireless elements that may be in simultaneous use in the same general area. For example, and not intended to be limiting, element 22 can be a personal computer (abbreviated as "PC"), element 24 a cell phone (abbreviated as "CELL") perhaps with an included digital still or video camera, element 26 a 1-way or 2-way pager (abbreviated as "PAG"), element 28 a wrist mounted communicator or watch or compass or GPS unit or a combination thereof (abbreviated as "WRIST"), element 30 a bar code reader (abbreviated as "BCR"), element 32 a personal digital assistant (abbreviated as "PDA") and element 34 a printer, which in this example also functions as a remote relay. These particular examples are provided merely for convenience of explanation and are not intended to be limiting. Any type of electronic device may be utilized in place of or in addition to the elements illustrated herein. As will be subsequently explained in more detail, elements 22-32 form ad-hoc network 48 within boundary 46, in that they are all within mutual SR-LP communication range of each other. PDA 32 is illustrated as being able to communicate with remote relay (e.g., printer) 34 and thereby provides a gateway for any of devices 22-30 to address remote relay (e.g., printer) 34, and in turn use remote relay 34 as a communication bridge for sending or receiving information from base station 35 via LR-HP wireless communication link 33 or alternatively via wireline communication link 55. Persons of skill in the art will understand that remote relay 34 is identified as a printer merely for convenience of explanation and that remote relay 34 may have any other function in addition to its dual mode communication relay function providing both wireless SR-LP communication link 31 or wireline communication link 55 and LR-HP communication link 33. Where devices 44 are generally located in a predetermined area, such as for example, but not limited to a warehouse, storage yard, shipping facility or the like, then devices having a reasonably even distribution in the facility are good candidates for remote relay 34. Non-limiting examples are water coolers, vending machines, photocopiers, image scanners, wall telephones and so forth. Such devices are typically connected to the facility power lines or phone lines or both and wireline communication therewith can be easily provided, for example, using Ethernet™ or Power-over-Ethernet (e.g., IEEE 802.3af) or other convenient wireline protocol or arrangement. In these circumstances wireless communication link 33, while possible, is not essential and wireline communication 55 is convenient.

In the prior art, WPAN 40 would have been formed by manually entering the WPAN identification data for the elements within outline 42 into the various elements or by using a barcode ring scanner with Bluetooth coupling to scan the identification code of the local master (e.g., element 32) for subsequent direct association. In the present invention, each of elements 22, 24, 26, 28, 30, 32, 34 has an RF identification tag (RFID) function included therein, that may be addressed by base station 35 using wireless communication paths 51, 53 to determine their individual location relative to base station 35. Within base station 35 are main hub transceiver 36 and location server 38 which determine the current location of elements 22, 24, 26, 28, 30, 32, 34 using any convenient RFID location technique. It does this in substantially real time. Non-limiting examples of suitable real time location system (RTLS) technologies are received signal strength indication (RSSI), time difference of arrival (TDOA) and phase difference of arrival (PDOA). These provide location information by triangulation using multiple transmitters or receivers. U.S. Pat. No. 6,414,626 B1, for example, describes an arrangement for measuring RFID tag range using a single transceiver operating at multiple frequencies. Range data from multiple transceivers may be used to provide location data. This is merely an example of many ways known in the art for obtaining location data using RFID tags or RFID functions. Any suitable position locating technology may be employed by main hub 36 and server 38 to determine the position of elements 22-34. These technologies can employ reflective backscattering for position location and need not rely on active signal transmission from elements 22, 24, 26, 28, 30, 32, 34. Thus, elements 22, 24, 26, 28, 30, 32, 34 need not transmit higher power signals for this purpose. This greatly simplifies many of elements 22, 24, 26, 28, 30, 32, 34 and reduces their power consumption. However, the use of locating signal transmitters on such elements is not precluded. Once the locations of these elements are known, then server 38 determines which subset(s) should logically form one or more WPANs. Server 38 then creates an association table. The association table is transmitted, for example, to elements 22, 24, 26, 28 via remote relay element 34 using LR-HP communication link 33 or wireline link 55. Element 34 then relays the information to element 32 and elements 22, 24, 26, 28 using, for example, Bluetooth over wireless links 31, 29. Thereafter, units 22, 24, 26, 28 for example, mutually communicate with each other as shown by wireless paths 25, 27 and with elements 32 (and through 32 to 34) as shown by wireless paths 29, 31 using SR-LP communication links 31, 29, 27, 25.

Server 38 can logically determine which elements should form a WPAN using any number of predetermined and/or adaptive criteria. Non-limiting examples of such criteria are: (a) associating elements that are within spatial boundary 42 of a predetermined size and/or shape, and/or (b) associating elements that are within spatial boundary 42 for a predetermined time t=t1, and/or (c) associate elements that move together substantially as a group for a predetermined time t2. Adaptive criteria may also be used, for example, tracking the whereabouts of elements 22, 24, 26, 28 relative to element 32 and/or element 34 and associating those elements that are within a predetermined distance of elements 32 and/or 34, and then repeating such associating steps periodically after time intervals t=t3. The duration of t3 may be made smaller or larger depending upon the rate of change of relative position of the elements, that is, their re-association may be carried out more or less frequently depending upon how rapidly the relative locations of the associated elements change with respect to each other and/or to their communication links 32, 34. The size of spatial boundary 42 and time durations t1, t2, t3 may be stored in memory 41 coupled to server 38 by link 39, or at any other convenient location in system 20. While element 32 is identified in the forgoing explanation as being outside of WPAN 40 but close enough so that it can relay the Bluetooth signals from elements 22, 24, 26, 28 of WPAN 40 to remote relay element 34, this is merely to illustrate a more general situation. Element 32 could equally well be a part of WPAN 40 if it satisfies the desired association criteria. Similarly, element 30 while also in Bluetooth communication range of some or all of elements 22, 24, 26, 28 but not a part of WPAN 40 could also be a part of WPAN 40, depending upon the association criteria applied by server 38.

An advantage of the present invention is that the signals 51, 53 generally used to locate the elements to be associated and signals 33 to transmit the association table, for the most part, need not be encrypted, thereby simplifying the signaling system. Once the various elements have been associated into WPAN 40, then the SR-LP (e.g., Bluetooth) signals being exchanged over wireless paths 25, 27 within WPAN 40 and paths 29, 31 with links 32, 34 may be encrypted so that data security is maintained. The low radiated power of the SR-LP signals among elements 22, 24, 26, 28, 30, 32, 34 also aids in privacy.

The following is an example of the application of the invented means and method to a military, public safety or rescue person carrying a number of sensors and other devices. Assume that the person enters the unit equipment locker or equipment storage place and loads up with equipment needed for a particular mission. The equipment may be worn or carried by the person on the mission. Such equipment can include some or all of the following: a helmet mounted communication headset, a GPS position locator, a heartbeat monitor, a temperature monitor, a two-way radio, a data telemetry link, a "Hazmat" environmental hazards monitor, a chart display, night vision goggles, a personal position locator, an oxygen or air tank pressure monitor, fire-arm, multi-purpose flashlight, etc., each of which is equipped with an RFID transponder and SR-LP communication capability or equivalent. The local equivalent of subsystem 35 of FIG. 1 determines, using the RFID techniques mentioned above or equivalent, that the above-listed elements are located within a very small spatial envelope (e.g., on the person's body or equipment harness) and moving together (when he or she moves they all move). Accordingly, it determines that they should form a WPAN. Other equipments located within the storage space are not included within this WPAN because they do not move as a group. Base station 35 then transmits the corresponding association table to whichever of the elements being carried by the person is acting as the signal relay (equivalent to element 34) and local master (e.g., element 32). If a signal relay does not exist in the WPAN, then any master device can satisfy this requirement as long as it is within range of base station 35 by using a SR-LP or LR-LP link with the base station. For example, Bluetooth has LR-LP link capability as well SR-LP link capability and the LR-LP link can be used instead of the 802.11 LR-HP link provided the transmitter and receiver are within range. The signal relay and local master in turn instruct each associated element to intercommunicate using their built-in SR-LP communication protocol (e.g., Bluetooth) and what addresses to use to send critical status data (e.g., heart rate, Hazmat data, temperature, oxygen tank pressure, etc.) via the relay or other link back to subsystem 35 or another monitor point located in the field where the mission will be carried out. The user needs to do nothing to form his or her WPAN. It is accomplished automatically as he or she chooses his or her personal instrumentation package and moves within or about or exits from the equipment storage location.

The elements in a particular WPAN can maintain their associated status without interference from other WPANs even when the other WPANs are within signal transmission range. This is possible because each element of the WPAN has a unique ID that can be included in the SR-LP transmission so that other elements in that WPAN and the relay link(s) respond in general only to direct signals from within the designated WPAN. Signals can be exchanged between different WPANs via relay links 32, 34 to a central monitoring point (e.g., base station 35 or equivalent in a field location). However, persons of skill in the art will understand that inter-WPAN communication elements can be included in a WPAN to permit certain signals to be exchanged directly among nearby WPANs if that is desired.

Figure 2:
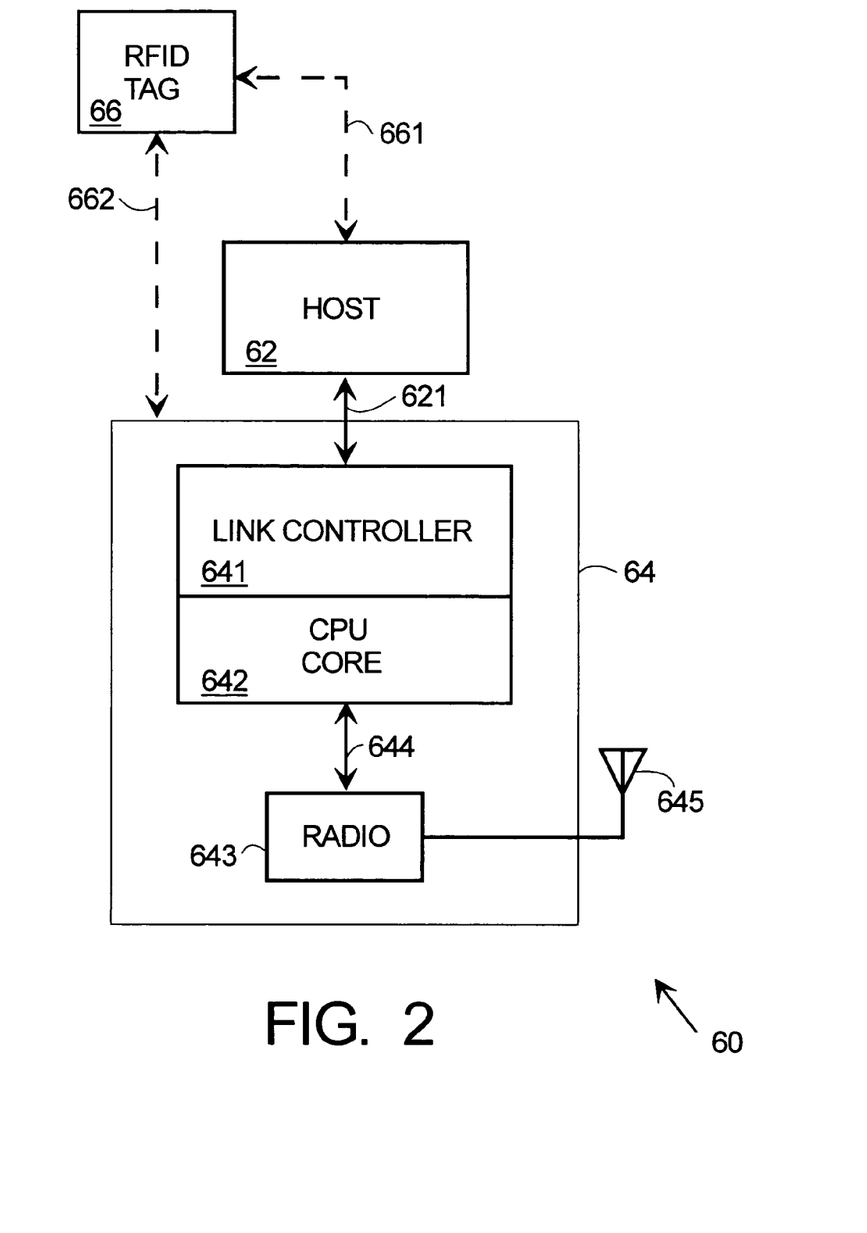
FIG. 2 is a simplified schematic diagram of a single representative element of the WPAN of FIG. 1.

FIG. 2 is a simplified schematic diagram of single representative element 60 of WPAN 40 of FIG. 1, illustrating the basic features thereof. Element 60 includes host 62, SR-LP communicator 64 and RFID tag function 66. Host 62 provides any of the functions previously listed (e.g., PC, PDA, CELL, PAG, WRIST, BCR, Hazmat detector, temperature sensor, pressure sensor, GPS, etc.) or any others that may be desired. SR-LP communicator 64 is preferably but not essentially a Bluetooth communicator with, for example, link controller 641 coupled to HOST 62 by link or bus 621, CPU core 642 coupled to link controller 641 and coupled to radio transceiver 643 by link or bus 644. Antenna 645 is coupled to radio 643 for sending and receiving the SR-LP signals generated by communicator 64. A booklet entitled "Bluetooth Beginner's Guide" explaining how a Bluetooth communicator functions may be obtained from the North American Headquarters of Ericsson, Inc., Plano, Tex. As explained therein, Bluetooth devices are capable of self-organizing, that is, of forming ad-hoc local networks with other Bluetooth devices within signal communication range, e.g., ad-hoc network 48 of devices 44 within outline 46 of FIG. 1. One (or more) of the elements within ad-hoc network 48 will act as a local "master" and the others will be "slaves". In addition to automatically forming ad-hoc network 48, the local master will look for a communication link (e.g., link 33) to a base station (e.g., base station 35) able to provide an association table to define a WPAN (e.g., WPAN 40) from among the ad-hoc network elements (e.g., from among elements 44).

RFID tag 66 is shown as a separate part within element 60, but this is merely for convenience of explanation. It may be coupled to HOST 62 by link or bus 661 and/or to SR-LP communicator 64 by bus or link 662, but this is not essential. The function of RFID tag 66 is to receive "Who are you?-Where are you?" signals 51 from base station 35 and transmit responses 53 so that base station 35 may locate RFID tag 66 (and therefore potential WPAN element 60) and track its movement. Suitable RFID tags are commercially available. While RFID tag 66 is shown in FIG. 2 as being an independent element, this is not essential and not intended to be limiting. In general the transponder function provided by RFID tag 66 may be stand-alone or coupled to or integrated either in HOST 62 and/or communicator 64. All three arrangements are useful. The ability to use a stand-alone RFID tag permits any Bluetooth equipped electronic device to be quickly added to the possible list of automatic association WPAN elements by merely attaching a stand-alone RFID tag and using it in conjunction with system 20 of the present invention. This is a great convenience. Alternatively, the RFID tag function may be integrated with other electronic functions of element 60. Either arrangement is useful.

Figure 3:
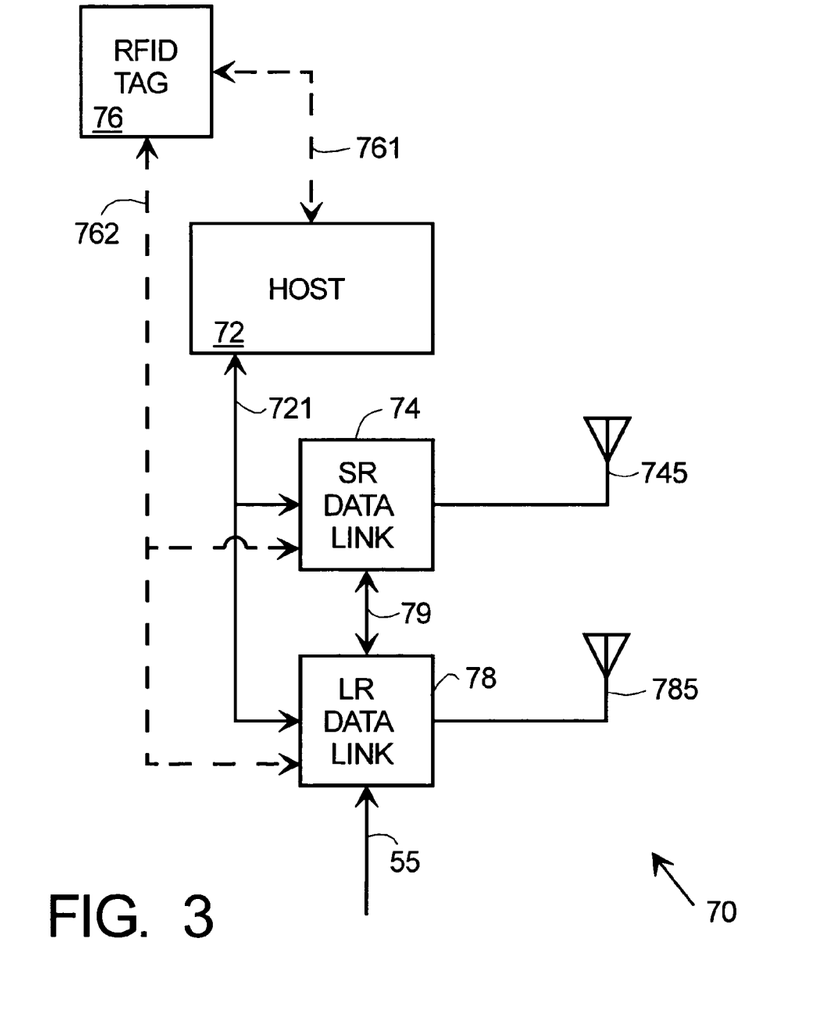
FIG. 3 is a simplified schematic diagram of a representative relay unit of the WPAN for communicating with a base station of FIG. 1.

FIG. 3 is a simplified schematic diagram of remote relay unit 70 whereby WPAN 40 can communicate with server 38 of base station 35. In FIG. 1, element 34 is shown as providing the remote relay function. However, any of elements 22, 24, 26, 28, 30, 32, 34 can be configured to perform this function. Hence remote relay unit 70 of FIG. 3 is intended to illustrate further details of element 34 or any other element that is selected to perform the communications relay function. Relay element 70 conveniently comprises HOST 72 (in the case of element 34, HOST 72 was a printer, but this is not essential). HOST 72 is analogous to HOST 62 of FIG. 2 and can be any of the elements discussed in connection with FIG. 2, or such other elements as the user may need. It may also be any of the facilities units (water coolers, telephones, copiers, etc.) mentioned earlier. HOST 72 is coupled by bus or link 721 to SR communicator 74 with antenna 745, analogous to communicator 64 with antenna 645 of FIG. 2. This provides the first communication mode of relay 70, i.e., the SR (e.g., Bluetooth) link. Also coupled to bus or link 721 is LR communicator 78 with antenna 785. Communicator 78 provides the second communication mode of relay 70, i.e., the LR (e.g., the 802.11 link). Alternatively, communicator 78 may provide the LR link by communicating with base station 35 over wireline link 55 instead of or in addition to communicating via antenna 785. Either arrangement is useful. Communicators 74, 78 may exchange signals via bus or link 721 or via direct bus or link 79. Either arrangement is useful. Either of communicators 74, 78 may act as the master controller. Among other things, a function of relay 70, 34 is to pass signals from elements 44 of ad-hoc network 48 to base station 35 and vice versa, and pass the association table generated by base station 35 back to selected members of ad-hoc network 48 so they know which should associate to form WPAN 40. Once WPAN 40 has been formed, relay 70, 34 can pass messages back and forth between base station 35 (or its field equivalent) and the members of WPAN 40. FIG. 3 illustrates the situation whereby element 78 provides a LR wireless link such as an 802.11 link or wireline link via bus or leads 55, but this is not essential. Provided that relay 70 is within range of or coupled to base station 35, any link protocol or arrangement can be used. For example, Bluetooth has a LR-LP wireless link capability that enables any master unit to function as a signal relay. Thus, element 78 in relay 70 may also be a Bluetooth protocol device using the LR-LP Bluetooth mode for communicating with base station 35. As noted earlier, element 78 may also communicate with base station 35 over wireline link 55 if available. Persons of skill in the art will understand that the present invention is not limited to the particular signaling protocols or arrangements or the particular signal relays illustrated herein. What is important is that at least one remote device be available to provide a communication link between WPAN capable devices 44 and base station 35.

Figure 4:
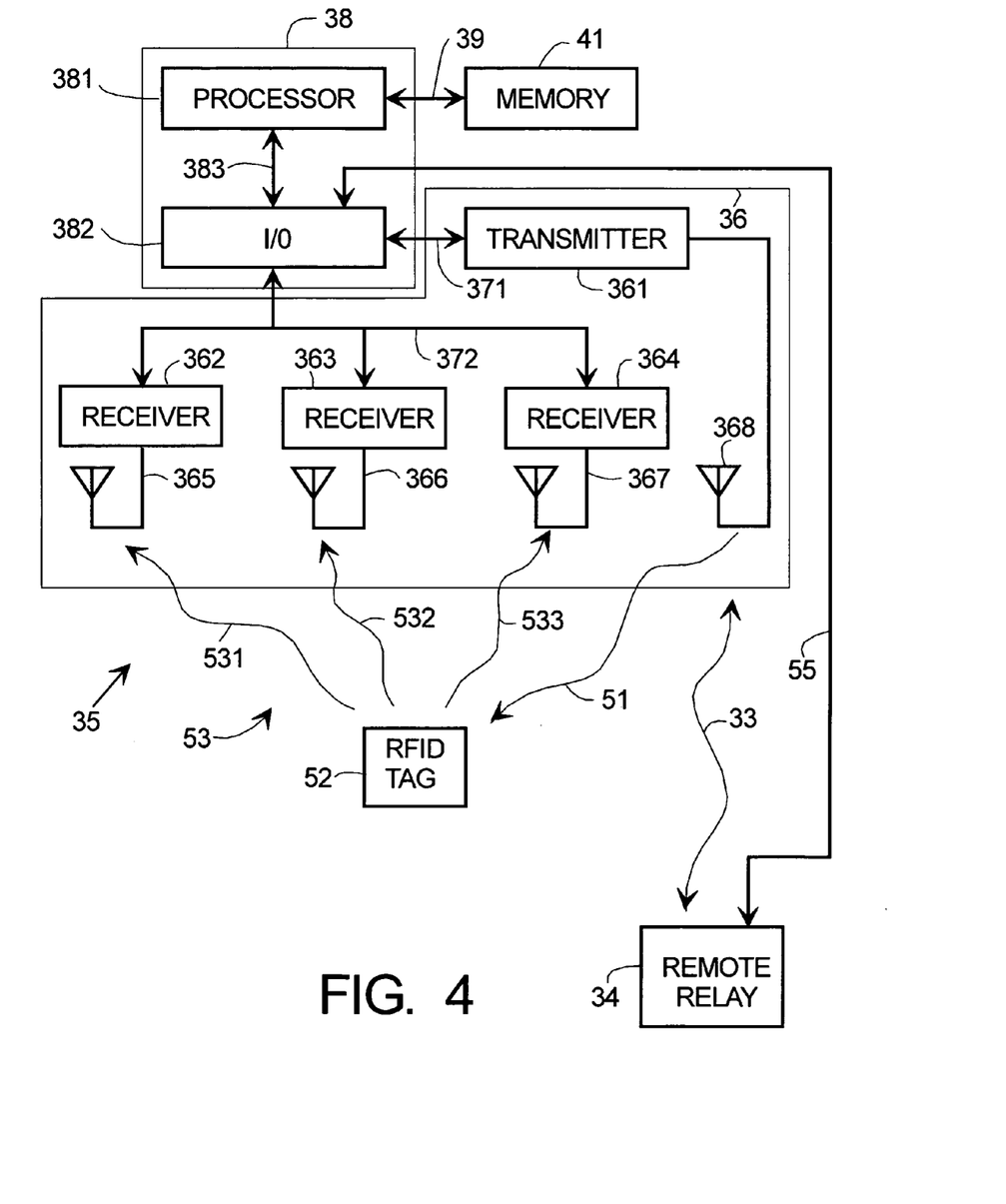
FIG. 4 is a simplified schematic diagram of the base station of FIG. 1 showing further detail.

FIGS. 4 is a simplified schematic diagram of base station 35 of FIG. 1, providing further details. Base station 35 automatically determines the locations of elements 22-32, decides which should be associated and sends the resulting association table to the WPAN elements. Base station 35 can also perform other functions in support of WPAN 40. Base station 35 comprises main hub transceiver 36, location server 38, and memory 41. Location server 38 comprises processor 381 coupled via link or bus 383 with I/O 382. Processor 381 is coupled via link or bus 39 to memory 41. I/O 382 is coupled via links or buses 371, 372 to main hub transceiver 36. Where remote relay 34 (or 70) is substantially fixed, I/O 382 may also be coupled to remote relay 34 (or 70) via wireline bus or link 55, but this is not essential. Main hub transceiver 36 comprises transmitter 361 with antenna 368 and, for example, receivers 362, 363, 364 with antennas 365, 366, 367. I/O 382 is coupled to transmitter 361 via link or bus 371. Receivers 362-364 are coupled to I/O 382 via bus or link 372. Transmitter 361 and receivers 362-364 operate under the control of processor 381. Transmitter 361 sends via antenna 368 outgoing wireless signal 51 that is received by RFID tag 52. Tag 52 represents RFID tags 66, 76 (or integrated tag functions) and any others carried by elements 22-34 of FIG. 1. Each of tags 52 responds either by backscatter modulation of incoming transmission 51 if it is a passive tag or by generation of a suitable response if it is an active tag, and sends wireless response signals 53 (e.g., 531-533) back to base station 35. Response signals 531-533 are signal 53 that follows different spatial paths back to receivers 362-364. Response signals 531-533 are received, for example, by spatially distributed antennas 365-367. Differences in time and/or phases of arrival of signals 531-533 are used by processor 381 in cooperation with receivers 362-364 to determine the ranges from tags 52 to the different antennas 365-367. These range differences permit the spatial locations of tags 52 to be determined by processor 381. While the arrangement shown in FIG. 4 is suitable for determining the location of tags 52, persons of skill in the art will understand that this is merely exemplary and that any other suitable location determining means may also be used. Once the locations of various tags 52 (e.g., 22, 24, 26, 28, etc.) have been determined, processor 381 in cooperation with memory 41 determines which should be associated into a WPAN using the methods previously described. Base station 35 then sends the association table using wireless communication link 33 and/or wireline communication link 55 to remote relay 34, 70, through which it is sent on to elements 22, 24, 26, 28, etc., desired to be associated in the WPAN. As previously explained, wireless communication link 33 may use 802.11 or Bluetooth or any other convenient signaling protocol that can be understood by whatever remote device is functioning as the relay. Persons of skill in the art will also understand based on the description herein that the term "RFID tag" or "tag" is not intended to be limited to a discrete RFID tag but to include those RFID functions that may be integrated with other portions of the electronics of the particular element of which they are a part.

While base station 35 is illustrated in FIG. 4 as comprising a single processor and transmitter with multiple spaced-apart receivers, this is merely for convenience of explanation and persons of skill in the art will understand based on the description herein that any real time location system (RTLS) arrangement may be used, for example and not intended to be limiting, multiple transmitters and a single receiver, multiple transmitters with multiple receivers, and so forth. Further, and not intended to be limiting, transmitter 361 can be a multi-function transmitter able to provide position locating signals 51 as well as information transmitting signals 33 using various signaling protocols, (e.g., 802.11, Bluetooth, Zigbee™, Ultra Wideband (UWB), etc.), or separate transmitters may also be used. Either arrangement is suitable. What is important is that base station 35 be able to determine the location of the individual potential WPAN elements so that it can, by either their real time proximity or proximity as a function of time or cooperative movement or other useful criteria or a combination thereof, decide which to associate into a WPAN and then send that association information to the WPAN elements. A non-limiting example of other useful criteria is the situation where certain PAN capable elements are used in pairs. Suppose that related elements A and B (e.g., a remote headset and a portable transceiver) are found in ad-hoc network 48 and only one meets, for example, the current proximity criteria, nevertheless, both may be included in the WPAN because they are part of a cooperating pair.

Figure 5:
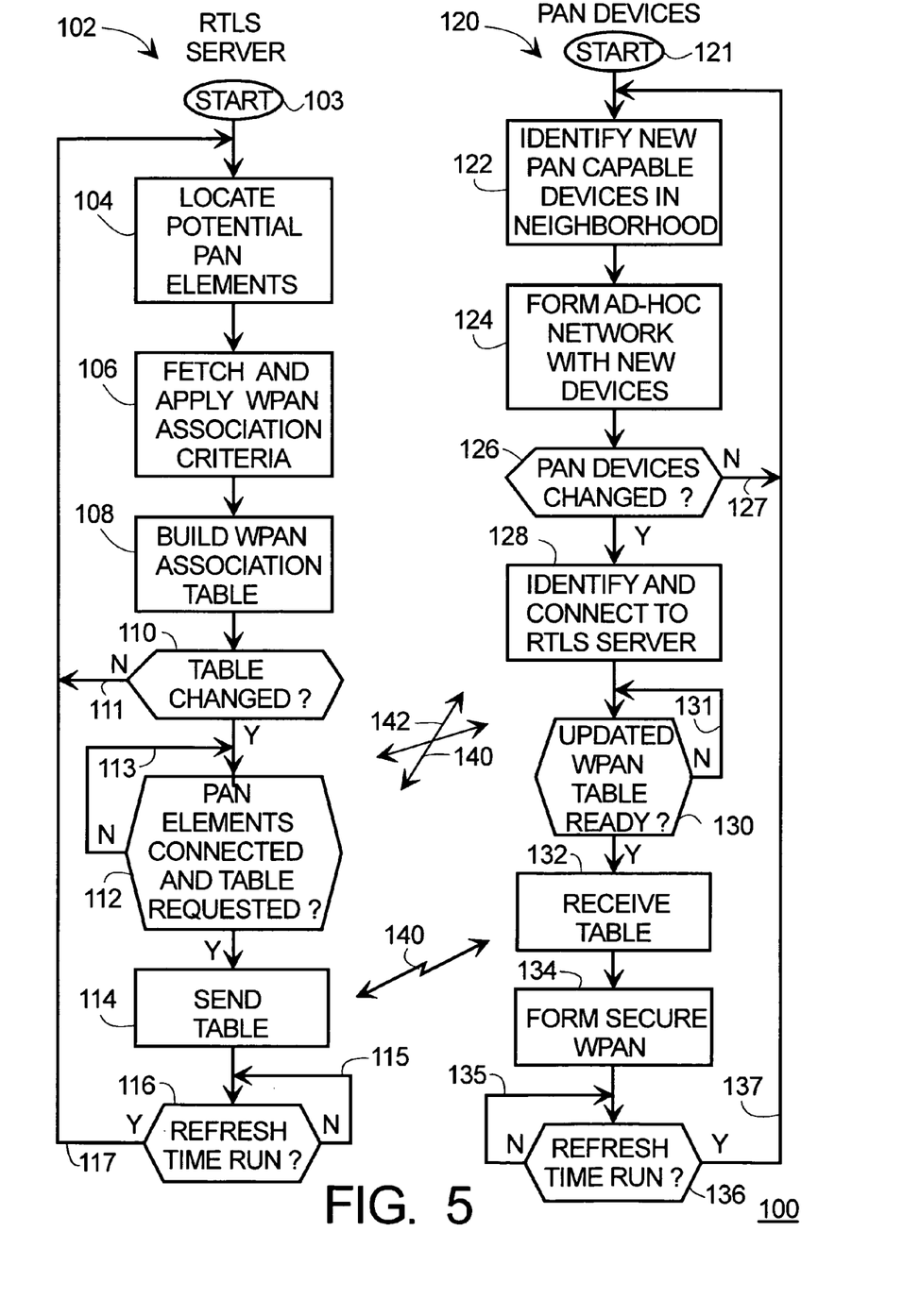
FIG. 5 is a simplified flow chart of the method of the present invention according to a first embodiment.

FIG. 5 is a simplified flow chart of the method 100 of the present invention according to a preferred embodiment. Method 100 comprises steps 102 initiated primarily by RTLS server 38 of base station 35 and steps 120 initiated primarily in the array of potential personal area network (PAN) capable devices (e.g., elements 22, 24, 26, 28, 30, 32, 34, etc.). Referring now to steps 102, START 103 desirably but not essentially occurs on system power-up. LOCATE POTENTIAL PAN ELEMENTS step 104 is executed whereby base station 35 locates the individual PAN elements using, for example the RFID tag functions incorporated therein, as has been previously explained in connection with FIGS. 1-4. FETCH AND APPLY WPAN ASSOCIATION CRITERIA step 106 is then executed, wherein the WPAN association criteria discussed earlier and stored in memory 41 are retrieved by server 38 and applied to the location data determined in step 104. It should be noted that the fetch operation can be performed before or after step 104 for locating the potential PAN elements. Once the location data and the association criteria are available, server 38 can determine which of available PAN elements 44 conform to the association criteria (e.g., are within a predetermined spatial boundary 42 and/or move as a group, etc.) so as to be desirably formed into WPAN 40. The particular association criteria used may depend upon the choices of the system designer or user according to the type of PAN elements likely to be encountered. In BUILD WPAN ASSOCIATION TABLE step 108, the results of step 106 are used to form the association table so that it is ready to be transmitted to the elements of WPAN 40. As used herein the words "association table" are not intended to refer merely to a columnar table of data. These words are intended to generally include any data form or data format for transmitting information about which devices should associate to form the WPAN, and whatever other information is needed for the WPAN to form and function. Thus, as used herein, the words "association table" are intended to have such broad meaning. TABLE CHANGED? query 110 is then desirably but not essentially executed to determine whether the association table determined in step 108 has changed from that determined in the last iteration of steps 102. If the outcome of query 110 is NO (FALSE) then steps 102 of method 100 loop back to start 103 as shown by path 111. Query 110 is desirable to conserve power in the WPAN elements by not signaling them when there is no change in the WPAN association table.

Referring now to steps 120 that begin with START 121, which occurs automatically when multiple PAN capable devices are active and within communication range of each other. In step 122 potential PAN devices 44 (e.g., 22, 24, 26, 28, 30, 32, 34, etc.) exchange signals under the direction of link controllers or CPU cores 641 using radios 643 (see FIG. 2) with each other, i.e., with all PAN capable devices 44 within communication range, so that any new (previously unidentified) PAN capable elements are noted. In the course of this exchange, certain PAN elements will publish themselves as master(s). The remainder are slaves. In step 124, for example following the Bluetooth protocol, the various PAN capable devices or elements exchange sufficient information to form ad-hoc network 48 of PAN capable devices 44 within mutual communication range, including any new PAN capable devices that had not been noted in previous iterations of steps 120. PAN DEVICES CHANGED? query 126 is then desirably but not essentially executed wherein it is determined whether the ad-hoc network of PAN devices formed in step 124 contains new members not previously noted in the last iteration of steps 120. If the outcome of query 126 is NO (FALSE) then steps 120 of method 100 loop back to start 121 as shown by path 127. This is desirable to conserve power in wireless elements 44 under circumstances where no new members are detected by eliminating the need to signal to base station 35 to report "no change." If the outcome of query 126 is YES (TRUE), then in step 128, ad-hoc network 48 formed by PAN capable devices 44 uses remote relay 34, 70 to identify and connect via main hub transceiver 36 or wireline link 55 or alternate communication path to RTLS server 38 of base station 35, looking for an association table. Where a particular remote relay 34, 70 is not available, any master WPAN device can function as the relay provided that it is in communication range with base station 35.

RTLS server 38 and ad-hoc network 48 exchange information as indicated by arrows 140, 142 so that RTLS server 38 can determine in step 112 (e.g., via relay 34, 70 or equivalent) whether or not PAN elements 44 are connected and ready to receive a WPAN association table. Similarly, PAN elements 44 can interrogate RTLS server 38 to determine in query 130 whether a WPAN association table is ready, or alternately RTLS server 38 tells PAN elements 44 that the WPAN association table is ready to be transmitted. Thus, query 130 is desirable but not essential. If the outcome of either query 112, 130 is NO (FALSE) then method 100 loops back as shown by paths 113, 131 until both the WPAN association table is ready and potential PAN elements 44 are coupled to server 38. When the outcome of query 112 is YES (TRUE) and the WPAN association table is ready, then in step 114, RTLS 38 sends the WPAN association table via base hub transmitter 36 or wireline link 55 and remote relay 34 (or an equivalent PAN master) to at least the elements within outline 42 telling them that they should associate as WPAN 40. This is indicated in method 100 of FIG. 5 by signal 140 coupling SEND TABLE step 114 in step sequence 102 and RECEIVE TABLE step 132 in step sequence 120. Signal 140 preferably complies with the 802.11 signaling standard, but other signaling protocols can be used depending upon the circumstances and/or whether wireline link 55 is available. This association information is automatically transmitted to the elements (e.g., 22, 24, 26, 28) intended to make up WPAN 40. Human intervention is not needed. As indicated in step sequence 120, the elements within outline 42 use the WPAN association table received in step 132 to execute step 134 wherein these elements form a secure WPAN and operate together. In the preferred embodiment but not essentially, REFRESH TIME RUN? queries 116, 136 are executed following SEND TABLE step 114 and FORM SECURE WPAN step 134. In queries 116, 136 it is determined whether predetermined iteration times have elapsed. If the outcomes of queries 116, 136 are NO (FALSE) indicating that it is not yet time to repeat steps 102, 120, then these queries are repeated as indicated by paths 115, 135 respectively. If the outcomes of queries 116, 136 are YES (TRUE) then method 100 loops back to START 102, 120 as indicated by paths 117, 137 respectively. The iteration delay times associated with queries 116, 136 may be the same or different according to the needs of the particular application of method 100. The instructions needed to execute step sequence 102 are conveniently stored in memory 41 and executed by server 38. The hardware and stored instructions needed to execute step sequence 120 are conveniently provided within communicator 64. In the case of the Bluetooth protocol, commercially available hardware can be micro-programmed to execute program sequence 120. Persons of skill in the art will understand how to do this based on the teachings herein and the available Bluetooth standards. One of the advantages of the present invention is that it can be implemented with minimum development and cost by use of, for example, the Bluetooth standard. This significantly simplifies deployment of system 20 according to the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for forming a Wireless Personal Area Network (WPAN) from a plurality of Personal Area Network (PAN) devices, comprising:
    a location determinator configured to address a radio frequency identification (RFID) tag function of each of said plurality of PAN devices, and to determine a location for each of said plurality of PAN devices using an RFID location technique;
    a comparator coupled to the determinator and configured to compare said location for each of said plurality of PAN devices with a WPAN association criteria in order to determine an identification of each of said plurality of PAN devices that at least partially satisfy said WPAN criteria, wherein said WPAN association criteria include one or more criteria selected from a group of criteria consisting of a PAN device of said plurality of PAN devices being located within a first spatial boundary of a predetermined size, the PAN device being located within a second spatial boundary of a predetermined shape, the PAN device being located within a third spatial boundary for a first predetermined time, the PAN device moving together with at least one other PAN device of the plurality of PAN devices substantially as a group for a second predetermined time, and the PAN device being located within a predetermined distance of a wireless element; and
    a communication link coupled to the comparator configured to transmit, to said plurality of PAN devices that at least partially satisfy said WPAN criteria, said identification of each of said plurality of PAN devices that at least partially satisfy said WPAN criteria in order to form a WPAN in which said plurality of PAN devices that at least partially satisfy said WPAN criteria mutually and directly intercommunicate with each other over wireless links.

2. The apparatus of claim 1 wherein the determinator determines the location of each of said plurality of PAN device as a function of time and the comparator selects those of said plurality of PAN devices that move substantially together and the communication link transmits the identification of the selected devices.

3. The apparatus of claim 1 wherein the communication link comprises a main hub transceiver coupled to the determinator and a remote relay transceiver coupled to said plurality of PAN devices.

4. The apparatus of claim 3 wherein the plurality of PAN devices intercommunicate using a first combination of data rate and signal power and the main hub and remote relay communicate using a second combination of data rate and signal power, different than the first combination.

5. The apparatus of claim 4 wherein the first combination, relative to the second combination uses shorter range lower power signals, and the second combination, relative to the first combination, uses longer range higher power signals.

6. The apparatus of claim 1 wherein the communication link comprises a wireline link to a remote relay and a wireless link from the remote relay to the plurality of PAN devices.

7. A Wireless Personal Area Network (WPAN), comprising:
    a plurality of Personal Area Network (PAN) devices each having a Radio Frequency IDentification (RFID) tag function;
    a remote communication node wirelessly coupled to at least two of said plurality of PAN devices; and
    a base station coupled to said remote communication node and said RFID tag function of said plurality of PAN devices, wherein said base station is configured to:
        address the RFID tag function of each of said plurality of PAN devices;
        determine a location for each of said plurality of PAN devices with at least partial utilization of said RFID tag function;
        compare said location for each of said plurality of PAN devices with a WPAN association criteria in order to determine an identification of each of said plurality of PAN devices that at least partially satisfies said WPAN association criteria, wherein said WPAN association criteria include one or more criteria selected from a group of criteria consisting of a PAN device of said plurality of PAN devices being located within a first spatial boundary of a predetermined size, the PAN device being located within a second spatial boundary of a predetermined shape, the PAN device being located within a third spatial boundary for a first predetermined time, the PAN device moving together with at least one other PAN device of the plurality of PAN devices substantially as a group for a second predetermined time, and the PAN device being located within a predetermined distance of a wireless element; and
        transmit said identification of each of said plurality of PAN devices that at least partially satisfy said WPAN association criteria to said remote communication node for distribution to at least two of said plurality of PAN devices so that said plurality of PAN devices that at least partially satisfy said WPAN association criteria can mutually and directly intercommunicate with each other within the WPAN over wireless links.

8. The network of claim 7 wherein the base station comprises at least one transceiver and at least three receivers for determining the location of said plurality of PAN devices.

9. The network of claim 7 wherein the WPAN association criteria employed by the base station include identifying a subset of the plurality of PAN devices that move as a group.

10. The network of claim 7 wherein the plurality of PAN devices intercommunicate using a Bluetooth or Zigbee compliant communicator function.

11. The network of claim 7 wherein the base station and the remote communication node intercommunicate using an 802.11 or Bluetooth or wireline communication arrangement.

12. A method for forming a Wireless Personal Area Network (WPAN) with a plurality of Personal Area Network (PAN) devices, comprising the steps of:
   addressing a radio frequency identification (RFID) tag function of each of said plurality of PAN devices;
   determining a location for each of said plurality of PAN devices using an RFID tag location technique;
   comparing said location for each of said plurality of PAN devices with a WPAN association criteria, wherein said WPAN association criteria include one or more criteria selected from a group of criteria consisting of a PAN device of said plurality of PAN devices being located within a first spatial boundary of a predetermined size, the PAN device being located within a second spatial boundary of a predetermined shape, the PAN device being located within a third spatial boundary for a first predetermined time, the PAN device moving together with at least one other PAN device of the plurality of PAN devices substantially as a group for a second predetermined time, and the PAN device being located within a predetermined distance of a wireless element;
   determining an identification of a subset of said plurality of PAN devices based at least in part upon said comparing step; and
   transmitting said identification of said subset of said plurality of PAN devices that at least partially satisfy said WPAN criteria to at least said subset of PAN devices so that said subset of said plurality of PAN devices can mutually and directly intercommunicate with each other within the WPAN over wireless links.

13. The method of claim 12 prior to the transmitting step, forming an ad-hoc network of said plurality of PAN devices, intercommunicating with each other and with the base station.

14. The method of claim 13, wherein the forming step employs the Bluetooth or Zigbee standard.

15. The method of claim 12 wherein the determining step comprises broadcasting a signal from a base station and detecting return signals from an RFID tag function associated with each of the plurality of PAN devices.

16. The method of claim 15 wherein the determining step comprises detecting the return signals using multiple receivers.

17. A method for forming a Wireless Personal Area Network (WPAN) from a plurality of Personal Area Network (PAN) devices, comprising:
   addressing a radio frequency identification (RFID) tag function of each of said plurality of PAN devices;
   determining a location for each of said plurality of PAN devices using an RFID tag location technique;
   comparing the location determined for each of the PAN devices with a WPAN association criteria, wherein said WPAN association criteria include one or more criteria selected from a group of criteria consisting of a PAN device of said plurality of PAN devices being located within a first spatial boundary of a predetermined size, the PAN device being located within a second spatial boundary of a predetermined shape, the PAN device being located within a third spatial boundary for a first predetermined time, the PAN device moving together with at least one other PAN device of the plurality of PAN devices substantially as a group for a second predetermined time, and the PAN device being located within a predetermined distance of a wireless element;
   choosing a subset of the PAN devices whose locations at least partially satisfy the WPAN criteria; and
   transmitting identification of the devices in the subset to at least the subset of PAN devices so that said subset of PAN devices can mutually and directly intercommunicate with each other within the WPAN over wireless links.

18. The method of claim 17 wherein the choosing step comprises choosing those PAN devices that are within a predetermined distance of each other.

19. The method of claim 17 wherein the choosing step comprises choosing those PAN devices that move substantially as a group.

20. The method of claim 17 wherein the choosing step comprises choosing those PAN devices that are within a predetermined distance of each other and move substantially as a group.

21. The method of claim 17 wherein the transmitting step comprises first transmitting to a remote relay and second transmitting from the remote relay to the subset of PAN devices.

22. The method of claim 21 wherein the first transmitting step comprises transmitting over a wireline link to the remote relay.

23. The method of claim 22 wherein the second transmitting step comprises transmitting over a wireless link.

* * * * *

UNITED STATES PATENT AND TRADEMARK OFFICE
CERTIFICATE OF CORRECTION

| | | |
|---|---|---|
| PATENT NO. | : 7,630,323 B2 | Page 1 of 1 |
| APPLICATION NO. | : 10/799063 | |
| DATED | : December 8, 2009 | |
| INVENTOR(S) | : Bridgelall | |

It is certified that error appears in the above-identified patent and that said Letters Patent is hereby corrected as shown below:

IN THE DRAWINGS

In Fig. 4, Sheet 4 of 5, for Tag "382", delete "I/0" and insert -- I/O --, therefor.
(ORIGINALLY FILED SPECIFICATION, IN THE DRAWINGS DATED MARCH 11, 2004, SHEET 4/5, FIGURE 4, TAG "382")

IN THE SPECIFICATION

In Column 1, Line 13, delete "modem" and insert -- modern --, therefor.
(ORIGINALLY FILED SPECIFICATION DATED MARCH 11, 2004, PAGE 1, LINE 7)

In Column 7, Line 62, delete "FIGS." and insert -- FIG. --, therefor.
(ORIGINALLY FILED SPECIFICATION DATED MARCH 11, 2004, PAGE 10, LINE 29)

Signed and Sealed this

Sixteenth Day of February, 2010

David J. Kappos
*Director of the United States Patent and Trademark Office*